United States Patent [19]

Nemirovsky

[11] Patent Number: 4,923,434
[45] Date of Patent: May 8, 1990

[54] HIGH PRECISION DRIVE MECHANISM

[75] Inventor: Robert Nemirovsky, 1117 Hyman Ave., Bay Shore, N.Y. 11706

[73] Assignees: Robert Nemirovsky, Bay Shore; Joseph Deutsch, Comack, both of N.Y.

[21] Appl. No.: 333,134

[22] Filed: Apr. 3, 1989

[51] Int. Cl.$^5$ ............................................. F16H 7/08
[52] U.S. Cl. ...................................... 474/101; 474/112
[58] Field of Search ............... 474/101, 109, 111, 112, 474/114, 133, 134, 167, 173; 74/390, 501.5 R

[56] References Cited

U.S. PATENT DOCUMENTS

| 4,571,220 | 2/1986 | Nakano et al. | 474/111 X |
| 4,610,645 | 9/1986 | Donn et al. | 474/112 |
| 4,634,407 | 1/1987 | Holtz | 474/112 |
| 4,688,742 | 8/1987 | Hettich | 474/112 X |

Primary Examiner—Thuy M. Bui
Attorney, Agent, or Firm—Kane, Dalsimer, Sullivan, Kurucz, Levy, Eisele and Richard

[57] ABSTRACT

A drive mechanism and/or transmission for transmitting power or motion to an object includes an input driving member, an output driven member, and a rigid coupling member. By changing the arrangement of the driving and driven members and the shape of the rigid coupling member, the object can be either rotated continuously, rotated in a reciprocated motion, or translated.

28 Claims, 4 Drawing Sheets

HIGH PRECISION DRIVE MECHANISM

BACKGROUND OF THE INVENTION

1. Field of the Invention

This invention pertains to a high precision drive mechanism for transmission of power and/or motion from an input shaft to an output shaft, which also may be used for moving objects to a predetermined position or angular orientation with high precision.

2. Description of the Prior Art

Drive components to transmit power and motion are necessary almost on every machine. Well-known chain drives, gears and flexible belt drives are used throughout the industry. Each of the above drives has advantages over another depending on the application.

Gear drives are expensive with demands for high precision, zero backlash and silence. They do not provide as smooth a transmission of motion as belt drives. Disadvantages of belt drives include the needed tensioning of the belts periodically to avoid slippage; deterioration because of severe exposure to chemicals and lubricants; and the requirement that damaged belts must be replaced rather than repaired. Conventional belts cannot be used where input and output shafts must be synchronized. Synchronous timing belts have relatively high cost and demand a fairly accurate alignment of pulleys.

Furthermore, inherently, prior art belt or chain drive mechanisms impose certain restrictions on the orientation of their pulleys and on the distances between the shafts thereof.

OBJECTIVES AND SUMMARY OF THE INVENTION

In view of the above mentioned disadvantages of the prior art, it is an objective of this invention to provide a very precise drive mechanism, which provides smooth, synchronous transmission of power and/or motion with zero backlash and low noise.

A further objective is to provide a durable and rugged drive mechanism which is easily adjusted for normal wear and tear.

A further objective is to provide a drive mechanism which comprises of a relatively small number of parts with simple shapes, thereby reducing the cost and size of the mechanism.

A transmission constructed in accordance with this invention is comprised of a driving member with pulley means coupled to a drive means and rotatively mounted on a base, a driven member with pulley means rotatively mounted on said base, and a rigid endless coupling member, being in a frictional engagement with said driving and said driven pulley means for transmitting power and/or motion from said driving member to said driven member. The mechanism also includes a tensioning means for assisting a frictional engagement of said coupling member with said driving and driven members.

A drive mechanism constructed in accordance with this invention may also be used for translating objects or work pieces with the rigid ring replaced by a rigid rod.

DETAILED DESCRIPTION OF THE INVENTION

In the following description, directional terms like up, down, left and right are used for purposes of illustration only. The drive mechanism described herein functions in any position or orientation.

A preferred embodiment of the invention is shown in FIGS. 1–4. Mechanism 10 constructed in accordance with this invention includes a support 12 and a driving pulley 14 secured to an input shaft 16 rotatively mounted on support 12. Input shaft 16 is coupled to a rotating device 18, as shown in FIG. 2a–2c. A rotating device 18 may be coupled to the opposite end of shaft 16 if desired, provided that this opposite end extends beyond the driving pulley. Rotating device 18 may be, for example, a hand wheel secured to a shaft 16 for manual operation or an electric motor or any other well-known means for motorized construction.

Figure 1:
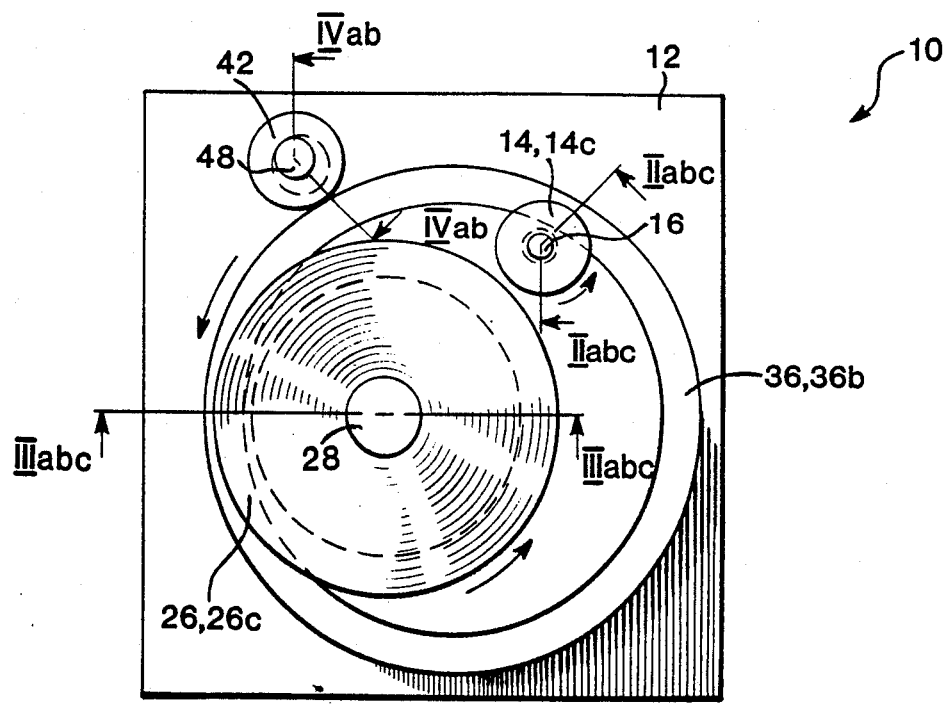
FIG. 1 shows a plan view of a preferred embodiment of the invention.
Figure 2A:
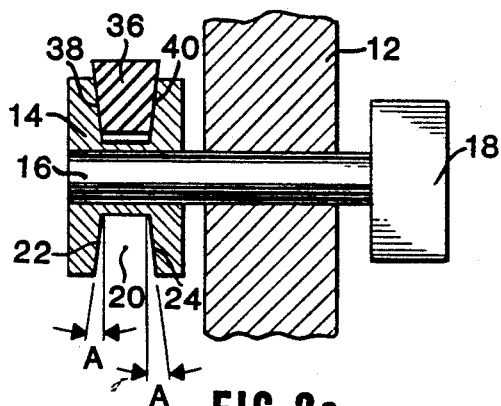
FIGS. 2a–2c are side sectional views on an enlarged scale of different embodiments of the driving pulley and coupling member for the mechanisms of FIGS. 1, 5, 6, 7, and 8.
Figure 2B:
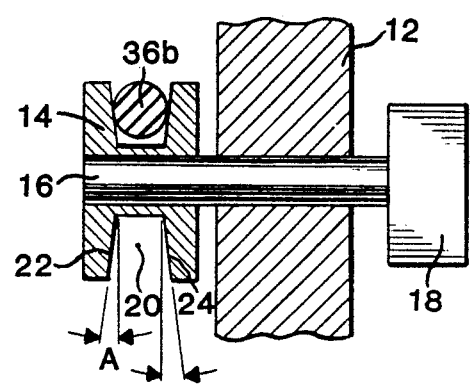

Driving pulley 14 has a circumferential groove 20. As shown in FIG. 2a and 2b, sidewalls 22 and 24 of the groove 20 are oppositely inclined and form an acute critical angle A with a plane perpendicular to shaft 16. Preferably, angle A is in the range of 2°–3°.

Figure 3A:
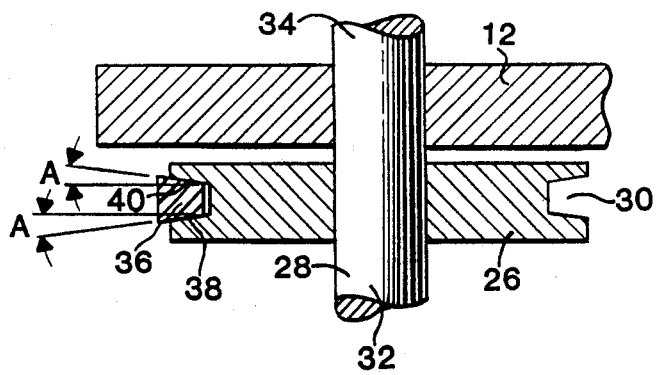
FIGS. 3a–3c are side sectional views on an enlarged scale of different embodiments of the driven pulley and coupling member for the mechanisms of FIG. 1, 5, 6, 7, and 8.
Figure 3B:
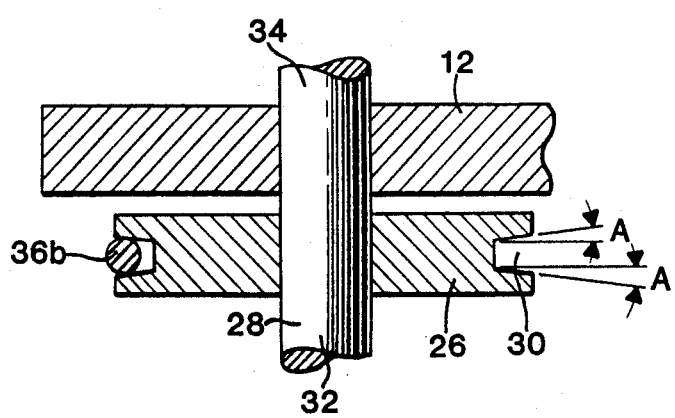

The mechanism 10 also includes a driven pulley 26 secured to an output shaft 28 rotatively mounted on support 12. The pulley 26 has a circumferential groove 30 with the side walls similar to groove 20, as shown in FIGS. 3a and 3b.

A work piece or any object, which requires rotation may be mounted on end 32 or 34 of the shaft 28. Alternatively, the work piece may be mounted directly on the pulley 26.

The mechanism 10 also includes a coupling ring 36, which is endless and rigid, for transmitting power and/or motion mechanically from driving pulley 14 to driven pulley 26, by being in constant frictional engagement with driving pulley 14 and driven pulley 26. As shown in FIGS. 2a and 3a, ring 36 preferably has two side walls 38, 40 tapered at the critical angle A, (defined above) therefore forming an isosceles trapezoid in cross-section.

Figure 4A:
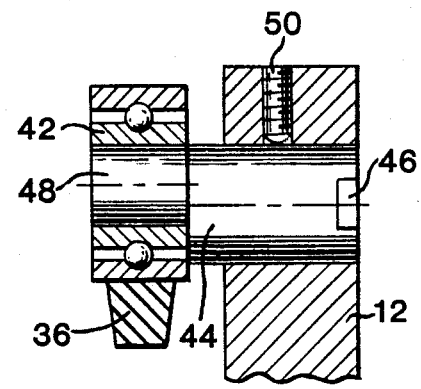
FIGS. 4a and 4b show a side sectional view on an enlarged scale of the tensioning bearing for the mechanisms of FIGS. 1, 5, 6, 7, and 8.
Figure 4B:
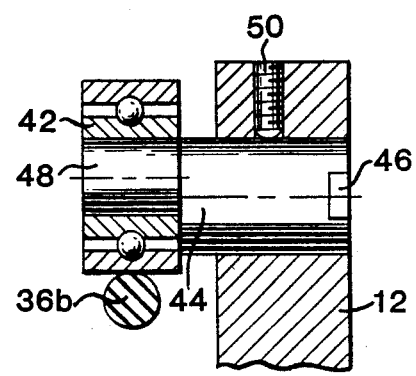

The mechanism 10 further includes a tensioning bearing 42 also rotatively mounted on support 12, by a bushing 44. A slot 46 is provided for easy manual rotation of a bushing 44 as shown in FIGS. 4a and 4b by means, for example, of a screw driver blade. The tensioning bearing 42 is firmly mounted on an eccentric shaft 48, which is parallel to the axis of bushing 44, and it is radially offset therefrom.

An initial tensioning applied to the ring 36 by the tensioning bearing 42 is adjusted by rotation of a bushing 44 which produces an eccentric movement of the tensioning bearing 42 toward or away from ring 36, thereby forcing a ring 36 into a frictional engagement with pulleys 14 and 26. A set screw 50 is threaded through the support 12 to secure bushing 44 in the desired position after adjustment.

Figure 5:
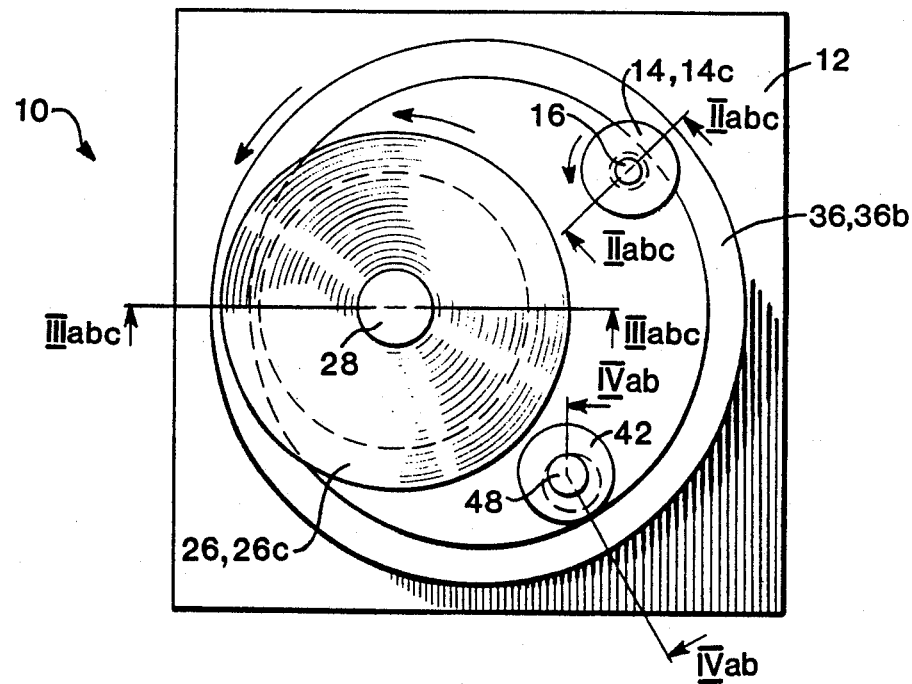
FIG. 5 is a plan view illustrating a different arrangement, wherein a tensioning bearing is mounted inside a coupling ring.

Other arrangements of the elements of a mechanism 10 are possible and may be chosen depending on a specific application. For example, FIG. 5 illustrates a different arrangement of a tensioning bearing 42 being mounted inside a ring 36, therefore resulting in a smaller space requirement for mechanism 10.

Many applications require a speed ratio variation. A mechanism in accordance with this invention is well-suited for such applications. The input/output speed ratio depends on the ratio of diameters of the driving and driven pulleys. For example, in the mechanism 10 of FIGS. 1-5, the diameter of driven pulley 26 is larger than diameter of a driving pulley 14, and therefore the output speed is reduced. It is obvious that for an increased output speed the rotating device 18 should be coupled to shaft 28 and the shaft 16 should be used for an output.

Figure 6:
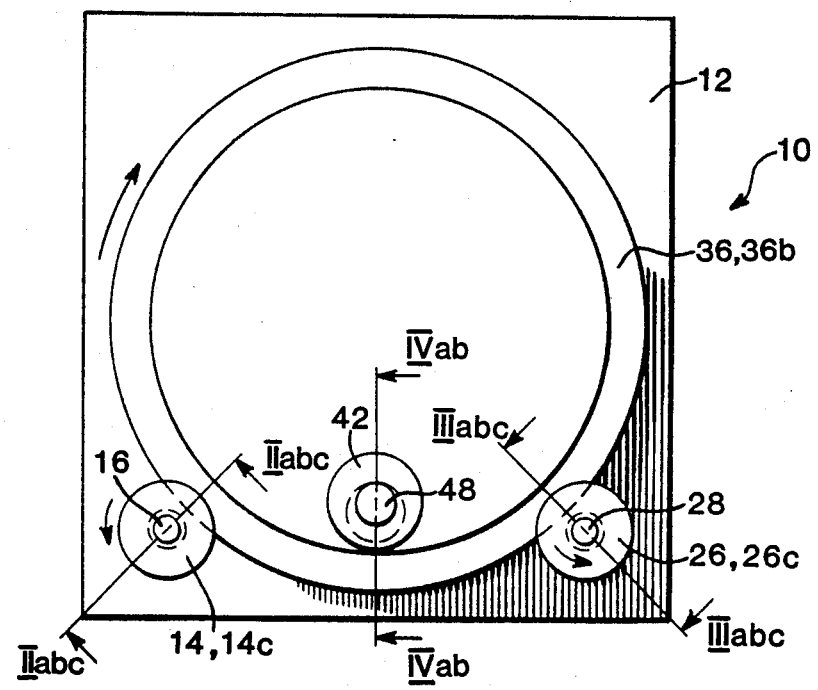
FIG. 6 is a plan view illustrating a different arrangement, wherein a driving and driven pulley of equal diameters are mounted outside a coupling ring.

Another arrangement of pulleys is shown in FIG. 6, wherein both a driving pulley 14 and a driven pulley 26 are mounted outside the ring 36. Both pulleys shown in FIG. 6 embodiment are of an equal diameter, resulting in a 1:1 speed ratio.

Other arrangements of pulleys may be used. One of the pulleys may be mounted inside a coupling ring while another - outside, provided that a tensioning bearing is mounted to force a coupling ring into a frictional engagement with grooves on the pulleys.

The operation of the transmission mechanism of FIGS. 1-6 is apparent from the above description. The tensioning force on ring 36 from bearing 42 creates a frictional engagement between a driving pulley 14, ring 36 and driven pulley 26. When input shaft 16 rotates, this frictional engagement causes output shaft 28 to rotate in the same direction.

Figure 7:
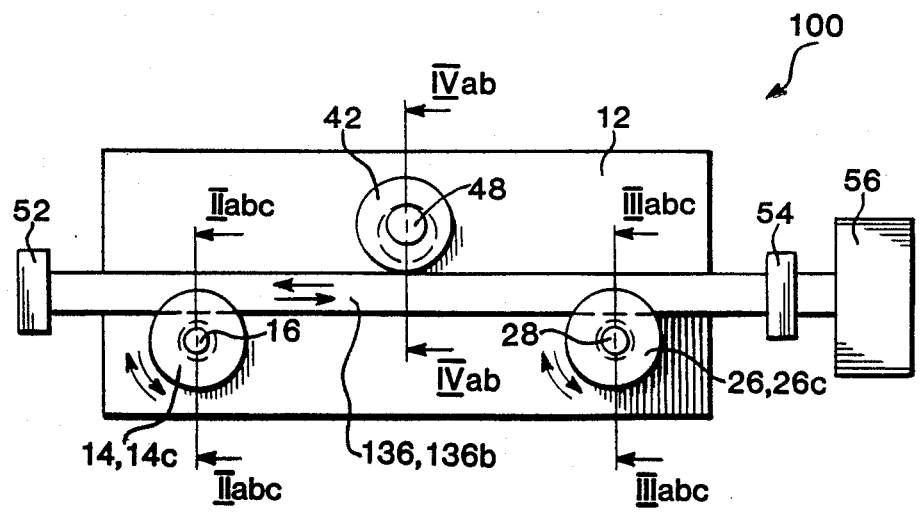
FIG. 7 shows another alternate embodiment of the invention, wherein the transmission coupling member is a rigid rod.

The mechanism 10 shown in FIGS. 1-6 with the coupling ring 36 being a rigid endless ring may transmit a rotary motion from an input shaft to an output shaft in a continuous mode in one direction, for example, counter clockwise or in a reciprocating mode. However, for a reciprocating rotation with predetermined angular orientation, a coupling member 136 in the shape of a rigid rod is a more convenient element. As shown in FIG. 7, in drive mechanism 100, rotation of an input shaft 16, for example, in a counter clockwise direction causes a linear movement of a rod 136 to the left and rotation of an output shaft 28 in a counter clockwise direction. Similarly, a clockwise rotation of an input shaft 16 causes the same rotation of an output shaft 28 with rod 136 moving linearly to the right. A work piece secured to either end 32 or 34 of a shaft 28 or to driven pulley 26 may be moved to a predetermined angular orientation controlled by the length of a rod 136. Limiters 52 and 54 may be secured at the ends of a rod 136 to assure definite stop. Alternatively, a work piece 56 secured to the rod 136 as shown in FIG. 7 may be translated along linear path.

However, a relatively large load mounted at one end of the rod 136 may cause undesirable bending of the rod. Therefore, a platform with a U-shaped groove (not shown) may be mounted on the rod 136, with the rod nested in the groove, at a position between pulleys 14 and 26. The work piece may be secured to the platform by well-known means.

Figure 8:
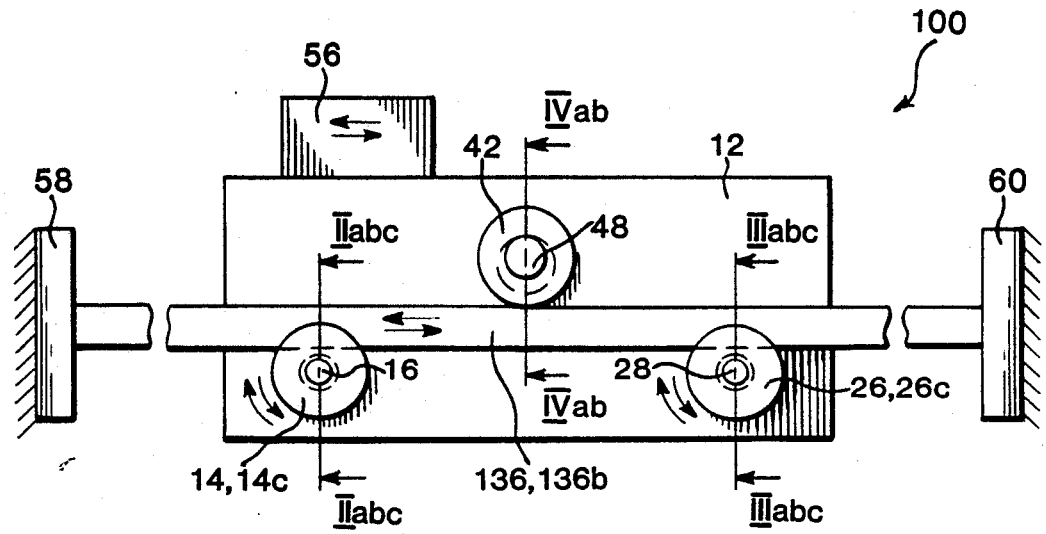
FIG. 8 shows another alternate embodiment for a linear motion mechanism.

A preferred embodiment for a translation of a work piece is shown in FIG. 8. Rod 136 is rigidly secured in the frame members 58 and 60 with all elements of a mechanism 100 being constructed similarly to those of FIGS. 1-7. A frictional engagement described above affords a translation of a support 12 along rod 136. A work piece 56 securely mounted on a support 12 may be translated and/or reciprocated. This latter embodiment may be modified in a simpler manner for easy manufacturing. Since pulley 26 assists only in the guidance and support of rod 136, it may be changed to a rotatively mounted roller without a circumferential groove. For example, a flanged ball bearing may be used instead of pulley 26. Such a bearing mounted on a shaft 28 could support and guide rod 136 with its bearing flange preventing lateral movement of rod 136. Alternatively, a similar flange may be provided on a tensioning bearing 42 or on both pulley 26 and bearing 42.

Figure 2C:
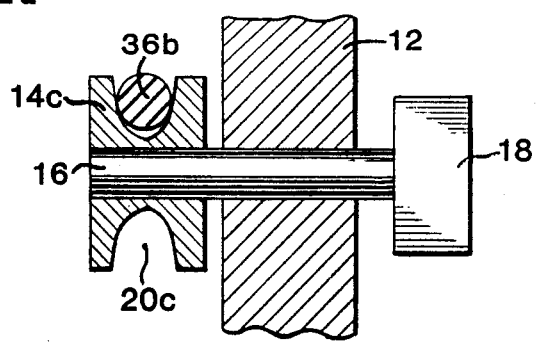
Figure 3C:
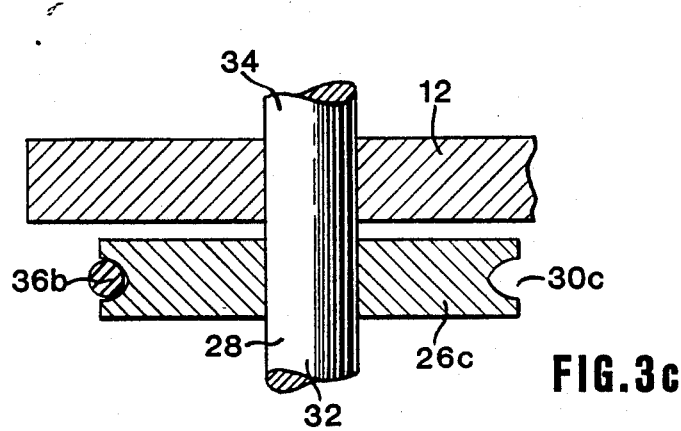

A drive mechanism described so far in the present application employed a frictional engagement between grooves in pulleys and a tapered coupling member, so as to insure a relatively large contact area between interfacing surfaces. The 2°-3° tapers are employed for their known, relatively significant frictional force. In the machine tool industry 2°-3° tapers are called self-holding tapers. They are used to hold in place many different attachments for metal cutting mechanisms. It is understood, that interfacing members of the present invention forced into a frictional engagement may have other cross-sectional shapes, such as round, elliptical, hexagonal and so on. For example, a coupling member 36b with circular cross-section is shown in FIGS. 2b, 2c, 3b, 3c and 4b. The contact area of circular member 36b with the grooves 20, 30 described above is generally reduced resulting in reduced load carrying capacity for the drive mechanism, but may be preferred for commercial devices, especially in the case of the translating mechanism. To increase the contact area of the coupling member 36b with circumferential grooves of the pulleys, these grooves may also have other cross-sectional shapes. For example, gothic arc grooves 20c and 30c formed on corresponding pulleys 14c and 26c are shown in FIGS. 2c and 3c. Moreover, the grooves of the pulleys may have matching or unmatched cross-sections. For example, a coupling ring with circular cross-section may be in a frictional engagement with one pulley having a groove with circular cross-section, and with a second pulley having a groove with a gothic arc cross-section.

As the contact surfaces of the interfacing members (the pulleys and coupling member) wear away the coupling member is easily tensioned by the rotation of bushing 44 as described above.

A mechanism constructed in accordance with this invention comprises of rigid parts with smooth surfaces, as opposed to flexible belt and chains and gears. Furthermore, mechanisms of a prior art require additional pre-loading. All three moving interfacing parts of this mechanism are constantly preloaded by the tensioning bearing for proper frictional engagement resulting also in a take up of any possible slack from manufacturing tolerances. Therefore, compared to the mechanisms of a prior art a mechanism constructed in accordance with this invention affords much higher precision, smoothness and synchronization in coupling motion and/or power from one shaft to another, yet is easier and less expensive to manufacture.

All parts of mechanism 10 may be made of the variety of materials from hardened metals to plastics and composites and alloys thereof depending on the application. Special coatings may be used on a ring and inside grooves of the pulley to increase a coefficient of friction if desired. A lubricant may also be applied to the moving parts.

Due to the high pressure forces between interfitting surfaces of pulleys and the coupling member a mechanism constructed in accordance with this invention permits the use of lubricants, which improve mechanism performance yet reduce useful frictional forces insignificantly.

It will be appreciated that, contrary to prior art devices, the mechanism disclosed herein does not have any restrictions on space orientation and the maximum dimension of the mechanism can be equal to the sum of the radii of the pulleys plus a minor spacing for clearance.

Obviously, numerous other modifications may be made to the invention without departing from its scope as defined in the appended claims.

I claim:

1. A transmission for transmission of power or motion to an object comprising:
    a support;
    a rotatable input member with input pulley means mounted on said support;
    a rotatable output member with output pulley means mounted on said support connected to said object; and
    a rigid coupling member arranged and constructed for frictional engagement of said input and output pulley means;
    whereby rotation of said input member is transmitted to the said output member by said rigid coupling member for movement of said object.

2. The transmission of claim 1 wherein said coupling member is a rigid endless ring.

3. The transmission of claim 1 wherein said coupling member is a rigid rod.

4. The transmission of claim 1 wherein said object is secured to said rotatable output member.

5. The transmission of claim 1 wherein said object is secured to said coupling member.

6. The transmission of claim 1 further comprising tensioning means for forcing said coupling member and said pulley means into frictional engagement.

7. The transmission of claim 6 wherein the tensioning means applies a force to said coupling means transversal to said movement.

8. A drive mechanism for moving a work piece comprising:
    a support;
    a coupling member having a first side and a second side;
    rotatable drive means disposed on said support and having two surfaces disposed at a critical angle selected for frictional engagement with said coupling member;
    guide means disposed on said support for guiding said coupling means in a movement induced by the rotation of said rotatable drive means; and
    tensioning means disposed on said support and in contact with said coupling member for applying a tension transversal to said movement.

9. The drive mechanism of claim 8 wherein said guide means is disposed on one of said two sides, and said tensioning means is disposed on the other of said two sides.

10. The drive mechanism of claim 8 wherein said drive means comprises a rotating device, a shaft coupled to said rotating device and a drive roller mounted on said shaft.

11. The drive mechanism of claim 8 wherein said guide means comprises a support shaft mounted on said support and a bushing mounted on said shaft, and in contact with said coupling means.

12. The drive mechanism of claim 8 wherein said drive means has an axis of rotation and is provided with a peripheral groove having two side walls pitched at said critical angle with respect to said axis of rotation.

13. The drive mechanism of claim 12 wherein said coupling member is a rod disposed in said groove.

14. The drive mechanism of claim 12 wherein said coupling member comprises a ring disposed in said groove.

15. The drive mechanism of claim 14 wherein said ring has at least two ring side walls contacting said groove and being pitched at said critical angle.

16. The drive mechanism of claim 8 wherein said tensioning means comprises a tensioning bushing mounted on said support, and an eccentric shaft mounted on said tensioning bushing.

17. A drive mechanism for moving a work piece comprising:
    a support;
    a drive member including a shaft rotatably mounted on said support, a rotating device coupled to said shaft and a drive roller mounted on said shaft, said drive roller having a peripheral groove with two surfaces disposed at a critical angle;
    a tensioning member including a tensioning bushing rotatably mounted on said support, an eccentric shaft mounted on said bushing, and tensioning bearing coupled to said eccentric shaft;
    a coupling element disposed in said groove for frictional engagement by said surfaces for inducing a movement of said coupling element in response to a rotation of said drive roller, said coupling element and contacting said tensioning member; and
    guide means for guiding said coupling element in said movement, said guide means including a supporting shaft mounted on said support, and a supporting bearing mounted on said shaft and in contact with said coupling element.

18. The drive mechanism of claim 17 wherein said work piece is mounted on said coupling element.

19. The drive mechanism of claim 17 wherein said supporting bearing is rotated by said coupling element, and said work piece is mounted on said supporting shaft.

20. The drive mechanism of claim 17 wherein said drive roller has a rotation of axis, and said groove is defined by two side walls pitched at a predetermined angle with respect to said axis of rotation for frictional engagement with said coupling element.

21. The drive mechanism of claim 20 wherein said predetermined angle is in the range of 2°-3°.

22. The drive mechanism of claim 21 wherein said predetermined angle is about 2.5°.

23. The drive mechanism of claim 20 wherein said coupling element is a rod.

24. The drive mechanism of claim 20 wherein said coupling element is a continuous ring.

25. The drive mechanism of claim 20 wherein said coupling element has a circular cross-section.

26. The drive mechanism of claim 20 wherein said coupling element includes two coupling side walls in contact with said roller side walls and pitched at said predetermined angle.

27. The drive mechanism of claim 17 wherein said supporting bearing includes two supporting side walls engaging said coupling element.

28. The drive mechanism of claim 27 wherein said supporting side walls are pitched at said predetermined angle.

* * * * *